April 10, 1934.  S. C. MOON  1,954,050
COAL DRILL
Filed May 28, 1931   2 Sheets-Sheet 1
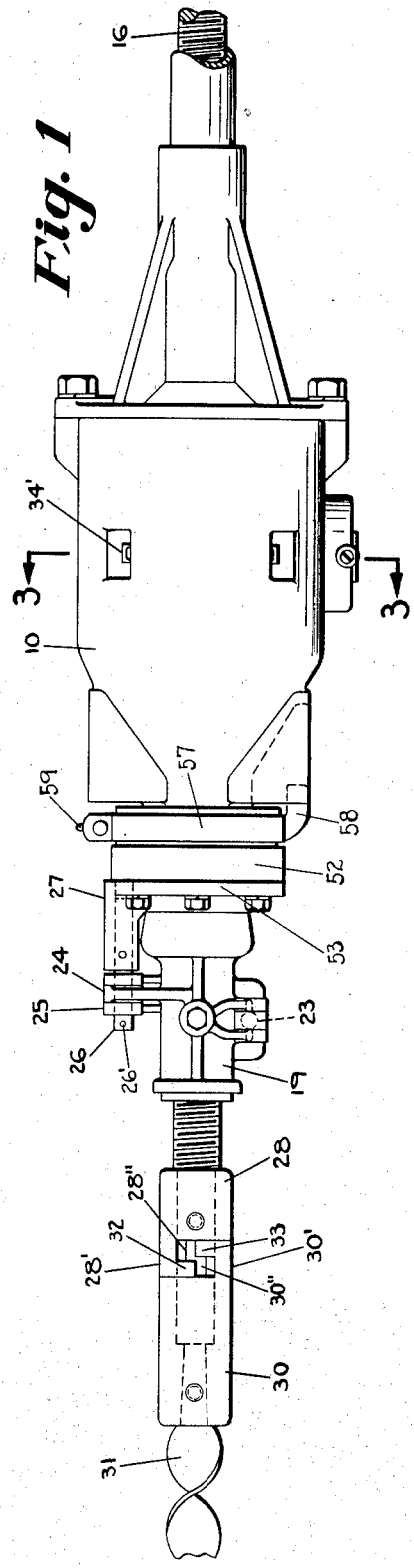
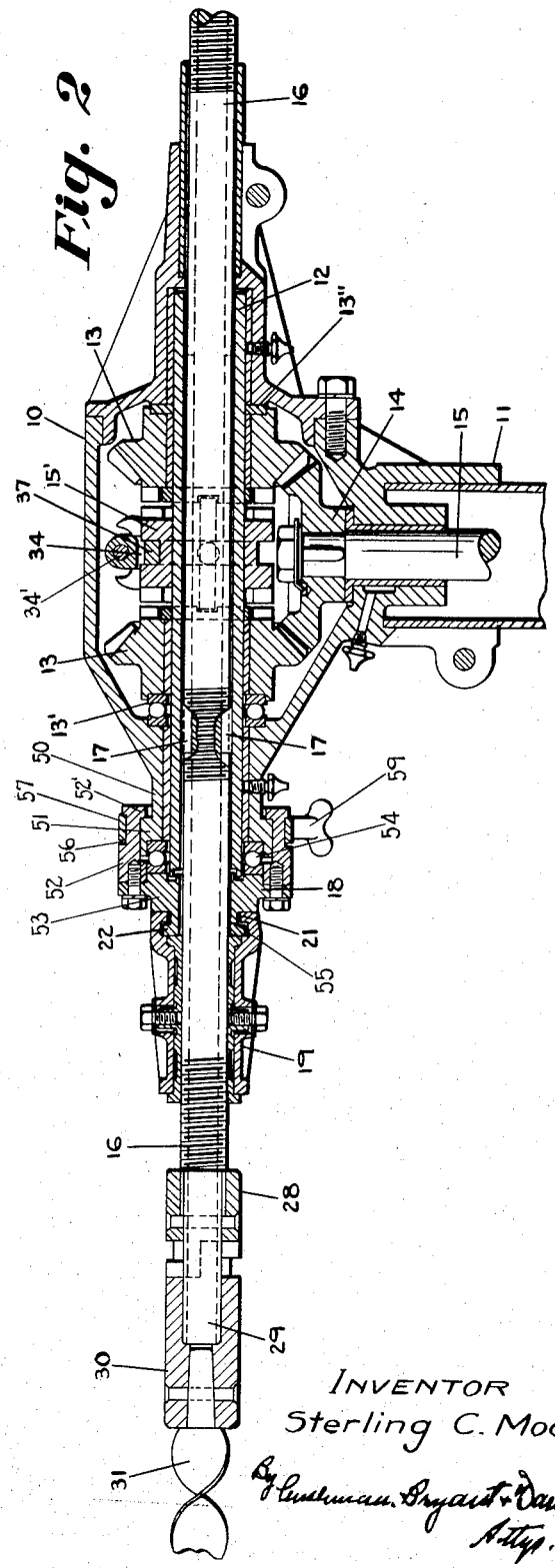
INVENTOR
Sterling C. Moon.

April 10, 1934.   S. C. MOON   1,954,050
COAL DRILL
Filed May 28, 1931   2 Sheets-Sheet 2

INVENTOR
Sterling C. Moon.

Patented Apr. 10, 1934

1,954,050

UNITED STATES PATENT OFFICE 1,954,050

COAL DRILL

Sterling C. Moon, Columbus, Ohio, assignor to The Jeffrey Manufacturing Company, Columbus, Ohio, a corporation of Ohio Application May 28, 1931, Serial No. 540,757

9 Claims. (Cl. 255—46)

The present invention relates to structure applicable to drills in general and particularly to drills of the type used in drilling shot holes in coal faces.

An object of the invention is to provide not only for the rapid and efficient operation of the drill in driving the hole, but also for the quick reversal of rotation and withdrawal of the drill after it has been driven to the desired depth, at the same time bringing out with it the refuse resulting from the drilling operation, so as to leave the hole clean, and, in the operation of drilling shot holes in a coal face, in proper condition for filling in and tamping the charge or shot.

The invention further has to do with a novel coupling between the drill holder and the drill driving screw which permits ready attachment and detachment of the drill but which, on reversal of the feed screw for withdrawal of the drill will interlock the parts during this operation so as to effect a positive action and withdrawing of the drill.

In the drawings herewith is illustrated one embodiment of my invention, but this is merely illustrative and in no sense restrictive, as equivalent mechanical expedients other than those here shown may be adopted in carrying out my invention.

In the drawings:

Figure 1 is a view in plan of a drill with my invention applied thereto.

Figure 2 is a view in longitudinal section through the drill shown in Figure 1.

Figure 3:
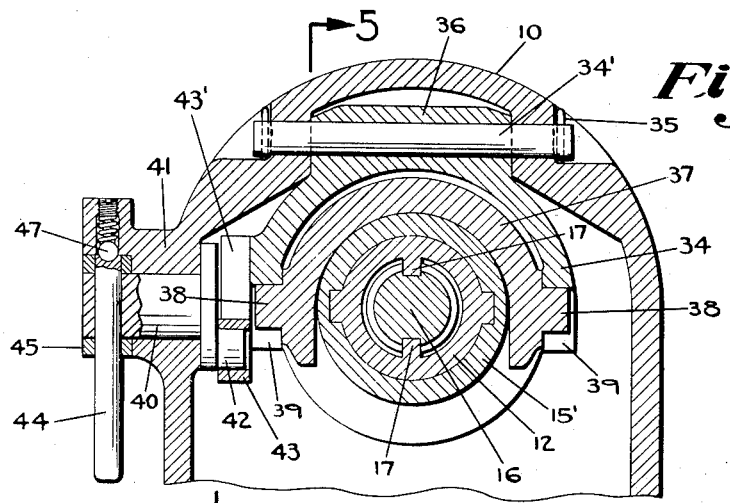
Figure 3 is a view in cross section substantially upon the line 3—3 of Figure 1, looking in the direction of the arrows.

Referring to the drawings by numbers, like numbers indicating like parts in the several views, 10 designates the main frame or casing for the drill operating parts provided with any suitable base 11 which will be carried on any suitable standard. Within said casing 10 is a quill 12, rotatably mounted in any suitable bearings, as shown in Figure 2. Mounted upon said quill 12 so as to rotate freely thereon, and provided with suitable end bearings 13' and 13" in the frame or housing 10, are gears 13, both driven from gear 14 mounted on shaft 15 driven from any suitable source of power. The gears 13 will, of course, be driven in opposite directions by the gear 14 and between the opposed gears 13 is a clutch sleeve 15' splined on the quill 12 so as to impart rotation in one direction or the other to the quill when the said clutch 15' is thrown to couple it with one or the other of the gears 13. Since the gear 13 at the left, Fig. 2, drives the quill in the feeding direction and hence is subjected to greater thrust from gear 14 than the other gear 13, end bearing 13' is constituted by a ball bearing.

Traversing the quill 12 is a feed screw 16 provided with keyways to receive keys 17 on the quill so that upon rotation of the quill in one direction or the other, dependent on the engagement of the clutch sleeve 15' with one or the other of the gears 13, the screw shaft 16 will be rotated. Forwardly, casing 10 terminates in a cylindrical neck 50 provided at its extremity with an annular shoulder 51, the neck being concentric with shaft 16. A head 18 comprises a annular portion 52, the rear portion of which surrounds shoulder 51 and has an inwardly extending flange 52' lying behind shoulder 51. A block 53 is secured to the forward end of annular member 52 and between block 53 and shoulder 51 is interposed a ball thrust bearing 54. Block 53 is provided with a bore which freely passes shaft 16 and has a forwardly projecting neck portion 55 provided at its extremity with an outwardly extending radial flange 22.

Seated in a circumferential recess 56 of annular member 52 is a friction band 57 which is held in fixed relation to the casing 10 by means of a bracket member 58. The free ends of band 57 are connected by bolt and thumb nut 59.

A nut 19 engaging shaft 16 in advance of head 18 is formed in two parts connected on one side by a thumb nut as at 23, the two parts being provided on the side opposite the nut with interengaging eye members 24 and 25 formed on the upper and lower parts respectively of the nut, the eyes being engaged by a pivot rod 26 supported in a socket 27 on block 53 so as to render the nut non-rotatable relative to the head. Each part of the nut has a semi-annular flange 21, Figure 2, engaged behind flange 22 of block 53.

In operation, thumb nut 59 is manipulated to tighten band 57 sufficiently so that under normal feeding conditions the head 18 and therewith nut 19 will be held against rotation with shaft 16 relative to the casing 10. The tension of the band is such, however, that if the advance of shaft 16 meets with extraordinary resistance as when impenetrable material is encountered, the band will permit the head 18 to rotate with shaft 16 so that advance of the shaft is reduced or entirely arrested.

When the shaft is being advanced, thrust is being exerted upon it in a direction toward the casing and is transmitted by the nut and head through thrust bearing 54 to the casing. Upon reverse rotation of the shaft 16 for withdrawal, thrust is, of course, exerted in the opposite direction and is transmitted to the casing through flanges 21, 22, and 52'. Flanges 21 and 22 constitute an important provision of the present invention since they are fully capable of transmitting all thrusts received thereby. Heretofore, in structures of this type a cotter pin, such as is indicated at 26' in the outer end of rod 26, has been relied upon to take the thrust upon withdrawal rotation of the feed shaft with consequent frequent binding or breakage of the parts.

At its forward end the screw shaft 16 is provided with an auger engaging and driving block 28, which may be pinned or otherwise suitably secured to the shaft, and the tip 29 of the screw shaft projecting beyond the head 28 engages in a socket in a block 30 secured to the shank of the auger 31 in any suitable manner, as by the rivet shown.

To mount the auger, the socket in block 30 is engaged over end 29 of the feed shaft. Tongues 28' and 30' on the respective blocks are then brought into lapped relation for mutual abutment upon rotation of the feed shaft in either direction. When the shaft is rotated to advance the auger, sides 28" and 30" of the tongues come into abutment, these sides being rectilinear and substantially in planes including the feed shaft and auger axis.

When, however, the screw shaft 16 is reversed through the gears and clutches, already described, it is necessary that there be a positive inter-locking of the parts so that the auger, while rotating, may be withdrawn. To accomplish this, the blocks 28 and 30 are provided with complementary interlocking lugs 32 and 33 which form a coupling of the well-known bayonet joint type, the parts being so formed that there is sufficient lost motion between the tongues to permit the auger and its block to be readily unshipped from the feed screw when the parts are in the position shown in Figure 1. When the feed screw 16 is reversed for withdrawal of the auger, lugs 32 and 33 will be immediately locked and a positive engagement of the blocks 28 and 30 brought about to effect rotation and withdrawal of the auger.

Figure 4:
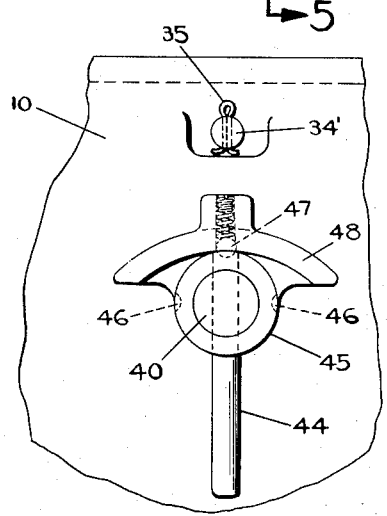
Figure 4 is a view in elevation of a portion of the drill frame showing the clutch shifting lever.
Figure 5:
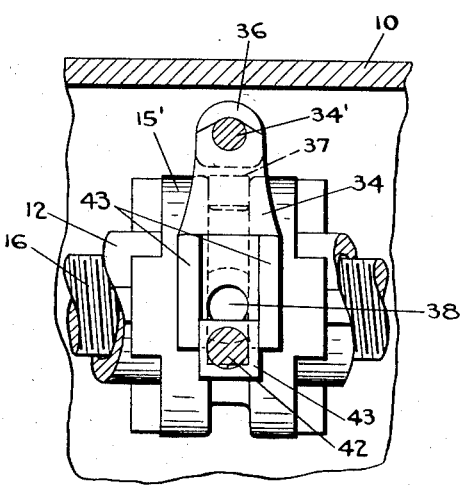
Figure 5 is a view in section on substantially the line 5—5 of Figure 3 looking in the direction of the arrows, portions of the mechanism being shown in elevation for clearness of illustration.

The clutch sleeve shifting mechanism may be of any desired construction, but in Figures 3, 4 and 5 is illustrated one form of mechanism well adapted to the needs of the particular structure here disclosed.

Referring to those figures, it will be observed that a clutch shifting yoke 34 is hung from a pin 34' removably mounted in the casing 10 and here shown with its ends housed within suitable seats formed in the outer wall of the casing 10 and held in place by cotter pins 35. The clutch shifting yoke is mounted to swing freely on the pin 34' with its suspension head 36 seated in a suitable recess in the frame and its arm depending to the sides of sleeve 15'. A half ring 37 engaged in an annular recess in the clutch sleeve is nested in the yoke and has trunnion pins 38 engaged in the slotted ends 39 of the yoke arms.

Any convenient manual device for throwing the clutch shifting yoke 34 may be provided, and there is here shown one efficient and novel form comprising a shaft 40 mounted in a bearing 41 offset and preferably integral with the frame 10, said shaft 40 carrying at its inner end a crank pin 42 on which is mounted a block 43 sliding in a guide way formed by walls 43' integral with one arm of the clutch shifting yoke.

An operating lever 44 fixed to the outer end of shaft 40 has a hub 45 provided with recesses 46 adapted to be engaged by a spring pressed ball 47 to hold the lever yieldingly in neutral, forward, or reverse position. A shield 48, integral with bearing 41, overlies hub 45.

While I have illustrated a preferred embodiment of the invention, it will be understood that I do not limit myself to structure except as in the following claims.

I claim:

1. In apparatus of the class described, a threaded feed shaft, a quill splined on said shaft, means restraining the quill against longitudinal displacement, a pair of bevel gears face to face on said quill and freely revoluble relative to the latter, a housing for said gears having thrust bearing portions for cooperation with the gears to prevent their displacement away from each other, a bevel drive pinion engaging both of said gears, means for selectively clutching said gears to said quill, and a feed nut engaging said feed shaft.

2. In apparatus of the class described, a threaded feed shaft, a feed nut engaging said shaft, a quill splined on said shaft, a pair of bevel gears face to face on said quill and freely rotatable relative to the latter, a bevel drive pinion engaging said gears, a clutch sleeve splined on said quill, means for sliding said sleeve to selectively engage it with said gears, said means comprising a yoke pivoted on an axis transverse to the sleeve and provided with slotted ends embracing the sleeve, a half ring nested in the yoke and lying in a circumferential groove formed in the sleeve, trunnions on said half ring engaged in the slotted ends of the yoke, and means for swinging the yoke.

3. In apparatus of the class described, a threaded feed shaft, a feed nut engaging said shaft, a quill splined on said shaft, a pair of bevel gears face to face on said quill and freely rotatable relative to the latter, a bevel drive pinion engaging said gears, a clutch sleeve splined on said quill, means for sliding said sleeve to selectively engage it with said gears, said means comprising a yoke pivoted on an axis transverse to the sleeve and provided with slotted ends embracing the sleeve, a half ring nested in the yoke and lying in a circumferential groove formed in the sleeve, trunnions on said half ring engaged in the slotted ends of the yoke, said yoke having a guide way formed on one of its ends, and a crank having a pin engaged in said guide way whereby oscillation of the crank swings the yoke to shift the sleeve.

4. In apparatus of the class described, a threaded feed shaft, a feed nut engaging said shaft, a quill splined on said shaft, a pair of bevel gears face to face on said quill and freely rotatable relative to the latter, a bevel drive pinion engaging said gears, a clutch sleeve splined on said quill, means for sliding said sleeve to selectively engage it with said gears, said means comprising a yoke pivoted on an axis transverse to the sleeve and provided with slotted ends embracing the sleeve, a half ring nested in the yoke and lying in a circumferential groove formed in the sleeve, trunnions on said half ring engaged in the slotted ends of the yoke, said yoke having a guide way formed on one of its ends, a block slidable in said guide way, and a crank having a pin journaled in said block wereby oscillation of the crank swings the yoke to shift the sleeve.

5. In apparatus of the class described, a casing, a threaded feed shaft revoluble in said casing, a head at the forward end of the casing through which the shaft passes, the head comprising a rear portion fixed to the casing and a forward portion rotatable relative to said rear portion, means preventing axial displacement of said forward portion relative to said rear portion, frictional means normally preventing rotation of said forward portion, a split nut engaging said shaft in advance of said forward portion, a pin on the forward portion of the head projecting forwardly thereof substantially parallel to the feed shaft, the portions of said split nut being pivoted on said pin, means for holding the portions of the nut together, and radially projecting means on said nut portions and on the forward portion of the head inter-engaged when the nut is closed to prevent axial displacement of said nut relative to said forward portion, said pin holding the nut against rotation relative to the head.

6. An apparatus of the class described, a casing, a threaded feed shaft revoluble in said casing, a head at the forward end of the casing through which said shaft passes, a circular flange at the forward end of the head concentric to the shaft, a split nut comprising separable portions internally grooved to form complementarily an annular groove when the nut is closed, closing of the nut enabling it to engage the threads of the feed shaft and to engage said circular flange in said annular groove whereby axial displacement of the nut relative to the head is prevented, means for holding the nut closed, and means preventing rotation of the nut relative to the head.

7. An apparatus of the class described, a threaded feed shaft, a quill splined on said shaft, a housing in which the end portions of the quill are journaled, abutment means at the ends of the quill to limit axial movement of the quill relative to the housing, at least one of said abutment means being removable to permit the quill to be slid out of the housing, a pair of bevel gears face to face on said quill in the housing and freely rotatable relative to the quill, the housing providing thrust bearing portions for cooperation with the gears to prevent their displacement away from each other, a bevel drive pinion engaging both of said gears, means for selectively clutching said gears to said quill, and a feed nut engaging said feed shaft.

8. An apparatus of the class described, a threaded feed shaft, a quill splined on said shaft, a housing having end walls in which the end portions of the quill are journaled, one of said end walls being remountable, means limiting axial movement of the quill relative to the housing, a pair of bevel gears face to face on said quill and freely rotatable relative to the latter, the end walls of the housing preventing displacement of said gears away from each other, a bevel drive pinion engaging both of said gears, a movable clutch element splined on the quill between said gears and movable to selectively connect the gears to the quill to rotate the latter, and a feed nut engaging said feed shaft.

9. An apparatus of the class described, a housing, a quill having its end portions journaled in said housing and held against axial displacement relative to the housing, a pair of freely rotatable bevel gears face to face on said quill within said housing and held against displacement away from each other, a bevel drive pinion engaging said gears, and means for selectively clutching said gears to said quill, said quill being provided with internal splines for cooperation with a feed shaft.

STERLING C. MOON.